(12) United States Patent
Gur et al.

(10) Patent No.: US 6,357,646 B1
(45) Date of Patent: Mar. 19, 2002

(54) HOLDER FOR MOBILE DEVICE

(75) Inventors: Serhat Gur; Omur Durmus, both of Istanbul (TR)

(73) Assignee: Nokia Mobile Phones Ltd, Espoo (FI)

( * ) Notice: Subject to any disclaimer, the term of this patent is extended or adjusted under 35 U.S.C. 154(b) by 0 days.

(21) Appl. No.: 09/726,191

(22) Filed: Nov. 29, 2000

(51) Int. Cl.[7] .................................................. A45C 1/04
(52) U.S. Cl. ........................ 224/683; 224/677; 224/237; 224/269; 224/901.4; 224/901.6; 224/930
(58) Field of Search ................................ 224/677, 682, 224/683, 236, 237, 269, 929, 930, 901.4, 901.6

(56) References Cited

U.S. PATENT DOCUMENTS

| | | | | |
|---|---|---|---|---|
| 184,822 A | * | 11/1876 | Pilkington | 224/236 X |
| 4,479,596 A | * | 10/1984 | Swanson | 224/236 |
| 5,533,809 A | * | 7/1996 | Gorman | 383/11 |
| 5,664,712 A | * | 9/1997 | Smrt | 224/250 |
| 5,833,093 A | * | 11/1998 | Honaker et al. | 222/175 |
| 6,244,485 B1 | * | 6/2001 | Holland et al. | 224/584 |

* cited by examiner

Primary Examiner—Stephen K. Cronin
(74) Attorney, Agent, or Firm—Brian T. Rivers

(57) ABSTRACT

The invention provides a holder for an article or mobile device. A holder according to one or more embodiment of the invention allows a device to be securely held in the holder while providing easy and flexible access to the personal device. The holder allows a user access to the device while the holder is in several positions. The holder may also include other features that increase the utility of the holder. For example, additional holder pockets may be implemented with the additional pockets being accessible in only certain of the several positions.

17 Claims, 3 Drawing Sheets

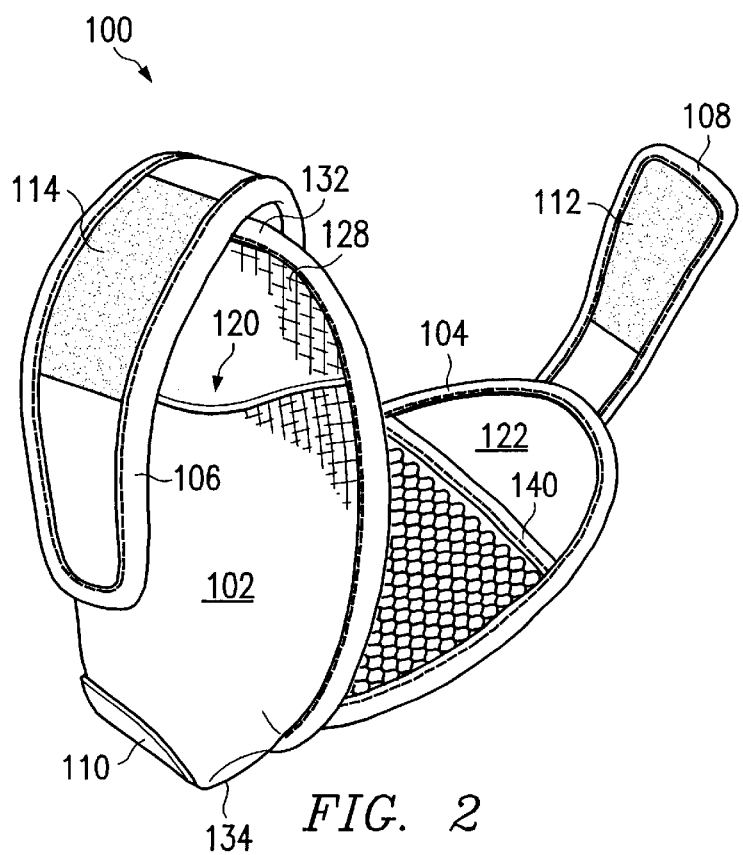
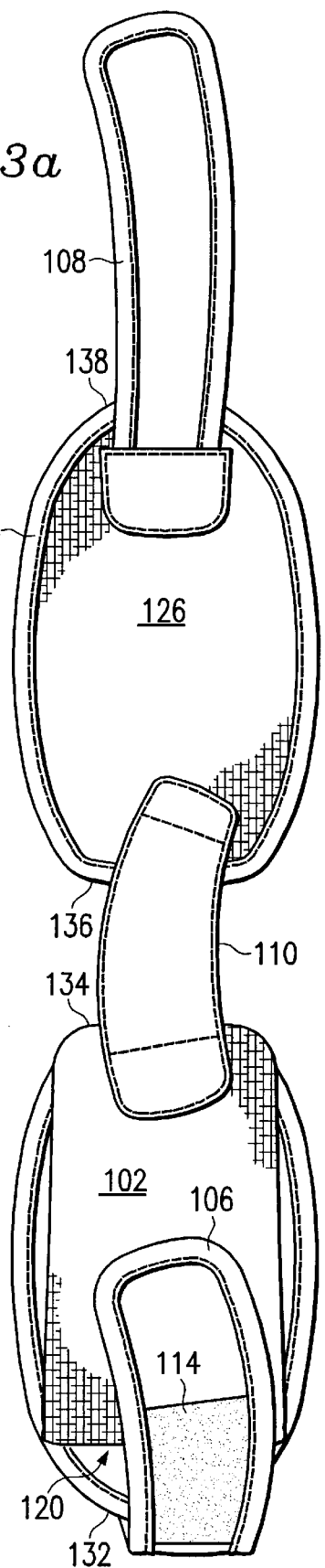
FIG. 3a
FIG. 2

HOLDER FOR MOBILE DEVICE

FIELD OF THE INVENTION

This invention relates to holders for personal articles or devices, and more particularly, to a holder for an article or mobile device that provides easy and flexible access to the article or device.

BACKGROUND OF THE INVENTION

Mobile devices, such as mobile telephones and personal digital assistants (PDAS), have become common place in today's society. As mobile devices have become increasingly smaller in size, allowing these devices to be carried on a person, various types of holders or carriers for these devices have been developed. These holders or carriers include, for example, belt clips that allow a device to be attached to a belt, and various other types of holders and carrying cases.

A design goal for designers of holders and carrying cases for mobile devices is to provide easy and flexible access to the device while providing increased utility in use of the holder or carrying case.

SUMMARY OF THE INVENTION

The invention provides a holder for an article or mobile device. A holder according to one or more embodiments of the invention allows a device to be securely held in the holder while providing easy and flexible access to the personal device. The holder allows a user access to the device while the holder is in several positions. The holder may also include other features that increase the utility of the holder. For example, additional holder pockets may be implemented with the additional pockets being secured or accessible in only certain of the several positions.

In an embodiment of the invention, the holder comprises a base section and a pocket section. The pocket section has a front and a rear surface, and a pocket formed on the front surface. The pocket has an opening toward a first end of the pocket section. The pocket section also has a securing strap that is attached to the first end of the pocket section toward which the pocket opens. The securing strap of the pocket section has a securing point on an inner surface of the securing strap that may be attached to a securing point disposed near the opening of the pocket, securing a device in the pocket. The securing strap of the pocket section also has a securing point on an outer surface of the securing strap.

The base section has a front and a rear surface. The base section also has a securing strap that is attached to a first end of the base section. The securing strap of the base section has a securing point on a surface. The base section also may have a mounting point for attaching to a belt, cord, or other device, allowing the user to wear the device. The base section and pocket section may be connected together with a flexible connector attached to a second end of the pocket section and a second end of the base section. The pocket section and base section may be moved between a first position and a second position. In the first position, the rear surface of the pocket section and front surface of the base section are secured against one another by the securing point on the surface of the securing strap of the base section being attached to the securing point on the outer surface of the securing strap of the pocket section. In the second position, the securing point on the surface of the securing strap of the base section and the securing point on the outer surface of the securing strap of the pocket section are detached from one another, and the pocket section and base section are loosely and flexibly connected. In the second position, the pocket section, including the mobile device, may be moved to an advantageous or preferred position for access or use. While the base section and pocket section are in either the first or second positions, the securing point on the inner surface of the securing strap of the pocket section may be attached or removed from the securing point near the opening of the pocket to secure the article in, or allow removal of the article from, the pocket without changing the securing of the rear surface of the pocket section against the front surface of the base section.

Also, in the embodiment, additional pockets may be formed on the front surface of the base section or the rear surface of the pocket section. There, additional pockets are protected while the pocket section and base section are in the first position and are accessible when the base section and pocket section are in the second position.

BRIEF DESCRIPTION OF THE DRAWINGS

The above set forth and other features of the invention are made more apparent in the ensuing Detailed Description of the Invention read in conjunction with the attached drawings, wherein.

FIG. 2 is a perspective view of the holder of FIG. 1 in a partly open position;

FIG. 3A is a rear view of the holder of FIG. 1 in the open position;

DETAILED DESCRIPTION OF THE INVENTION

Figure 1A:
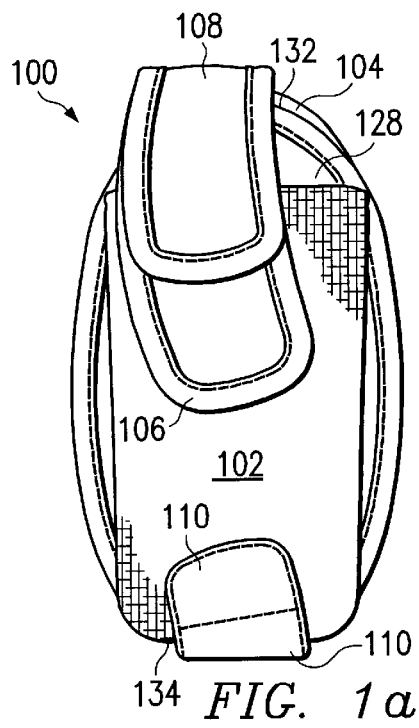
FIG. 1A is a front view of a holder in a closed position according to an embodiment of the invention.
Figure 1B:
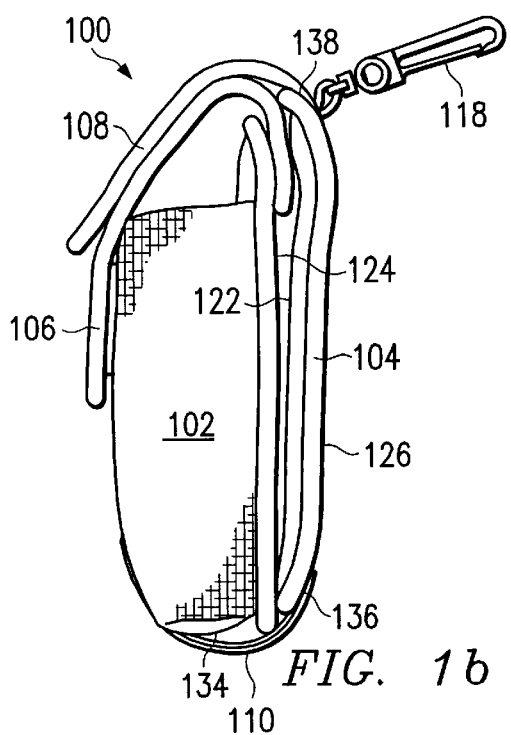
FIG. 1B is a side view of the holder of FIG. 1A in the closed position.

Referring now to FIGS. 1A and 1B, therein are a front view and a side view, respectively, of a holder 100, according to an embodiment of the invention. Holder 100 comprises a pocket portion, or pocket 102, a base portion, or base section 104, a flexible connector 110, a first securing strap 106, and a second securing strap 108. Holder 100 may also comprise a mounting device, for example, a hook 118, to allow holder 100 to be secured to a belt, or cord, or other mounting point.

Pocket portion 102 has a front surface 128, a rear surface 124, a bottom end 134, and a top end 132. A pocket is formed on front surface 128, with the pocket having an opening 120 toward top end 132. First securing strap 106 includes securing point 112 and securing point 114, mounted on opposite surfaces of first securing strap 106. First securing strap 106 is mounted on top end 132 of pocket portion 102. A securing point 130 is also formed or mounted on pocket portion 102, near opening 120.

Base section 104 has a front surface 122, a rear surface 126, a bottom end 136, and a top end 138. Second securing strap 108 includes securing point 116 on a surface. Second securing strap 108 is near top end 132 of pocket portion 102. Flexible connector 110 is attached at each of its two ends to bottom end 134 of pocket portion 102, and bottom end 136 of base section 104. In the embodiment, securing points 112, 114, 116, and 130 may be implemented using adhesive cloth or fabric.

Figure 1C:
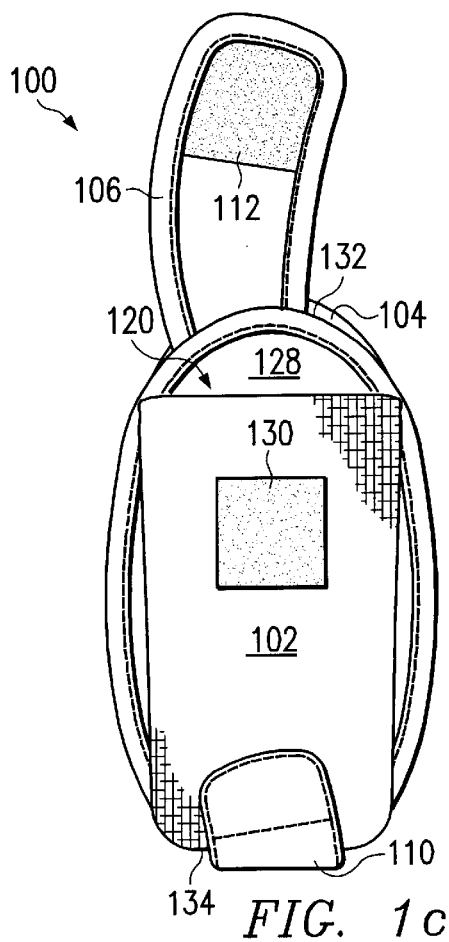
FIG. 1C is a front view of the holder of FIG. 1A in the closed position with the pocket open.
Figure 1D:
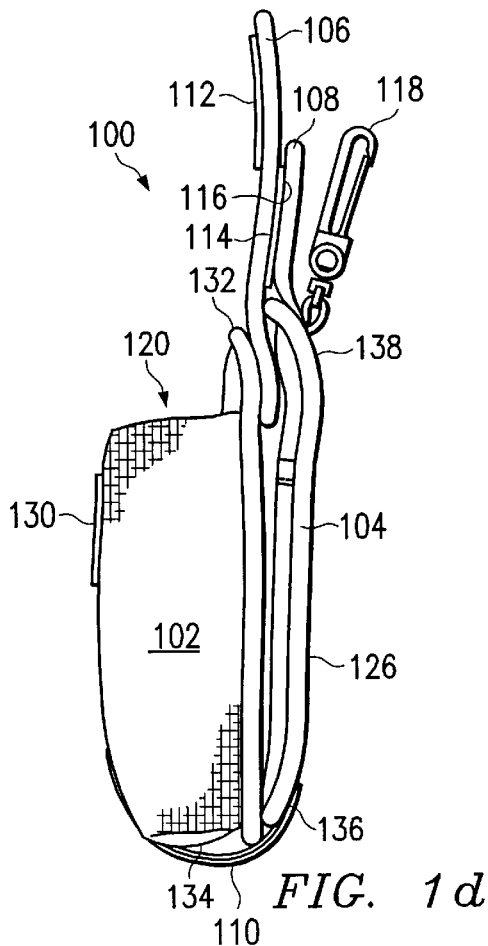
FIG. 1D is a side view of the holder of FIG. 1A in the closed position with the pocket open.

Pocket portion 102 and base section 104 may be positioned relative to one another to put holder 100 in a closed position as shown in FIGS. 1A–1D. When holder 100 is in a closed position, as in FIGS. 1A–1D, pocket portion 102 is secured against base section 104 so that rear surface 124 of pocket portion 102 is secured against front surface 122 of base section 104. Pocket portion 102 and base section 104 are secured and held in the closed position by the attachment of securing point 114 on first securing strap 106 to securing point 116 on second securing strap 108. While holder 100 is in the closed position, first securing strap 106 may be moved to open or close pocket opening 120 by attaching, or detaching, securing point 112 to, or from, securing point 130 on pocket portion 102. FIGS. 1A–1D show the pocket closed, and FIGS. 1C–1D show the pocket open. In this way, a mobile device can be secured in pocket section 102 or removed from pocket section 102 without changing holder 100 from the closed position with pocket portion 102 secured against base section 104.

Figure 3B:
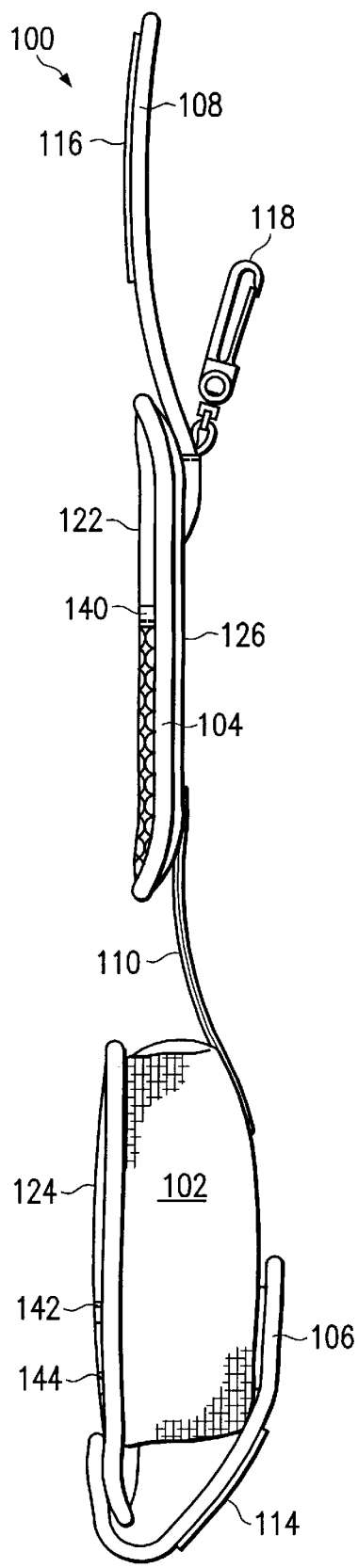
FIG. 3B is a side view of the holder of FIG. 1 in the open position.
Figure 3C:
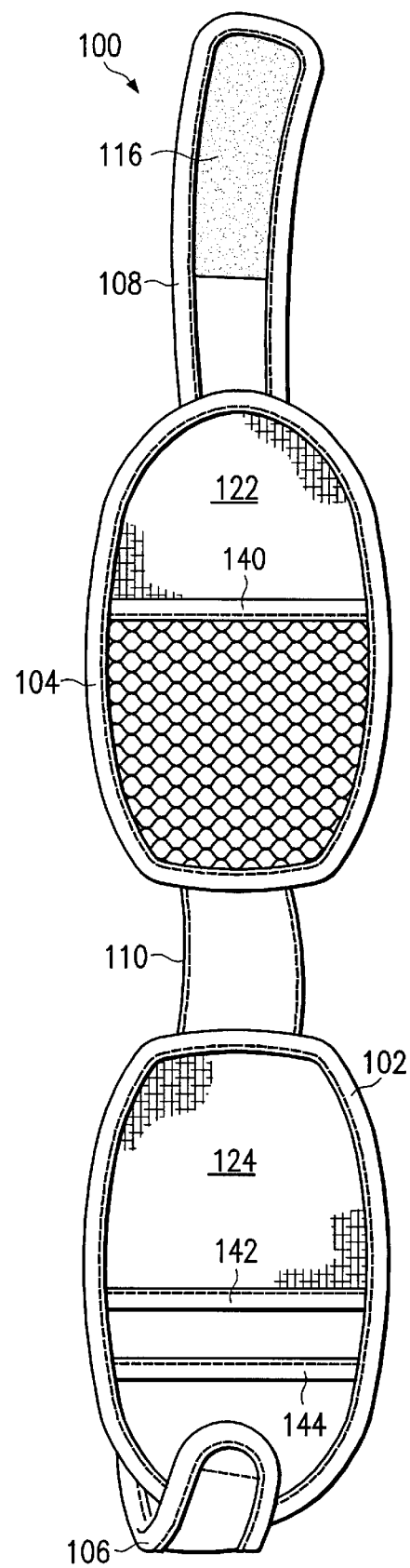
FIG. 3C is a front view of the holder of FIG. 1 in the open position.

Holder 100 may also be put in an open position in which pocket portion 102 and base section 104 are positioned relative to one another as shown in FIG. 2 and FIGS. 3A–3C. FIG. 2 is a perspective view of holder 100 in a partially open position. FIGS. 3A–3C are rear, side, and front views, respectively, of holder 100 in the open position. When holder 100 is in the open position, securing point 114 on first securing strap 106 and securing point 116 on second securing strap 108 are detached from one another and pocket portion 102 and base section 104 are attached loosely and flexibly by flexible connector 110. When holder 100 is in the open position, as shown in FIGS. 3A–3C, the pocket of pocket portion 102 may be opened or closed using first securing strap 106. For example, pocket portion 102 can be moved and handled at an extended distance from mounting device 118, at the length of base section 104 and flexible connector 110, while mounting device 118 is attached to a belt or a cord worn around the users neck, allowing easier and closer access to pocket portion 102. FIG. 2 and FIGS. 3A–3C also show additional pockets 142 and 144, and 140 implemented on surfaces 124 and 122, respectively. When pockets 142, 144, and 140 are implemented, access to pockets 142, 144, and 140 is also allowed when holder 100 is in the open position, and pockets 142, 144, and 140 are protected and secured when holder 100 is in the closed position.

Various alternative embodiments of a holder according to the invention may be realized. For example, a holder according to the embodiments of the invention may be implemented by using various types of materials and configurations to construct pocket portion 102, base section 104, securing straps 106 and 108, connector 110, and securing points 112, 114, 116, and 130. For example, securing points 112, 114, 116, and 130 may be configured from snap fasteners or buttons. The various components of holder 100 could be configured from a material such as cloth, or other rigid or flexible materials and have shapes that differ from the shapes of the embodiment. Thus, while the invention has been shown by example of particular preferred embodiments, it will be understood by those skilled in the art that changes in form and details may be made therein without departing from the scope and spirit of the invention.

What is claimed is:

1. A holder for holding an article, said holder comprising:
   a pocket, said pocket having a first and a second end, a rear portion, and a front portion, said pocket further having a securing point disposed on said front portion of said pocket, wherein said first end of said pocket has an opening to receive the article in said pocket;
   a first securing strap, said first securing strap having a first and a second end, and a first and second surface substantially opposite one another, wherein said first securing strap includes a first and a second securing point, each disposed, respectively, on said first and second surface of said first securing strap, said first securing strap mounted on said rear portion of said pocket at said first end of said pocket, said first securing point of said first securing strap being attachable to said securing point of said pocket to secure the article in said pocket:
   a base section, said base section having a first and a second end and a front and a rear surface;
   a flexible connector, said flexible connector having a first and a second end, said first end of said flexible connector attached to said second end of said pocket, and said second end of said flexible connector attached to said second end of said base section; and
   a second securing strap, said second securing strap having a first and a second end, and a surface, wherein said second securing strap includes a securing point on said surface of said second securing strap, said second end of said second securing strap disposed on said first end of said base section, wherein said pocket may be moved from a first position wherein securing point on said surface of said second securing strap is attached to said second securing point on said second surface of said first securing point, and said front surface of said base section is secured against said rear surface of said pocket, and a second position wherein said securing point on said surface of said second securing strap is detached from said second securing point on said second surface of said first securing point and said pocket hangs separately from said base section by said hinge connector, and said first securing point of said first securing strap may be attached to, or detached from, said securing point of said pocket to close, or open, said pocket while said pocket and said base section are in either said first or said second position.

2. The holder of claim 1, wherein said article is a mobile communication device.

3. The holder of claim 1, wherein said first and second securing points of said first securing strap, said securing point of said pocket, and said securing point of said second securing strap comprise adhesive surfaces.

4. The holder of claim 1, wherein said holder further comprises a mounting device disposed on said first end of said base section.

5. The holder of claim 1, wherein said rear surface of said pocket and said front surface of said base section each have a perimeter, wherein the perimeters are substantially the same shape as one another.

6. The holder of claim 1, wherein said pocket comprises a first pocket and said front surface of said base section includes a second pocket, said second pocket having an opening facing toward said first end of said base section.

7. A holder for an article, said holder comprising:
   a first portion, said first portion having a first and a second end, and a first and a second surface, said first portion having a pocket disposed on said first surface, said pocket having an opening at said first end of said first portion, said first portion further having a first securing surface disposed near said opening on said pocket, said first portion, further, having a strap, said strap disposed on and extending from said first end of said first portion, and a second and a third securing surface disposed on said strap, wherein said second securing surface of said first portion is attachable to said first securing surface of said first portion to secure the article within said pocket;

a second portion, said second portion having a first and a second end, and a first and a second surface, said second portion further having a strap, said strap disposed on and extending from said first end of said second portion, and a securing surface disposed on said strap of said second portion;

a flexible connector, said flexible connector having a first and a second end, said first end of said flexible connector attached to said second end of said first portion and said second end of said flexible connector attached to said second end of said second portion, wherein said first portion and said second portion are moveable between a first and a second position, wherein said second surface of said first portion and said first surface of said second portion are substantially secured against one another by attachment of said third securing surface of said first portion to said securing surface of said second portion while in said first position, and said first portion and said second portion are loosely and flexibly connected while in said second position, and wherein said second securing surface of said first portion is attachable, or removable from, said first securing surface on said pocket of said first portion, to secure the article in, or allow removal of the article from, said pocket, while said first portion and said second portion are in either said first or second position, respectively.

8. The holder of claim 7, wherein said second portion further comprises a pocket disposed on said second surface of said second portion, said pocket having an opening at said first end of said second portion.

9. The holder of claim 8, wherein said first portion further comprises a pocket disposed on said second surface of said first portion, said pocket having an opening at said first end of said first position.

10. The holder of claim 9, wherein said second portion further comprises a mounting device disposed on said first end of said second portion.

11. The holder of claim 7, wherein said first and second portions each have an outline, wherein the outlines of said first and second portions are substantially identical.

12. The holder of claim 7, wherein said securing surface of said first portion, and said first, second, and third securing surfaces of said second portion comprise adhesive surfaces.

13. The holder of claim 7, wherein said article comprises a mobile communications device.

14. The holder of claim 7, wherein said flexible connection comprises a strap.

15. A holder for a mobile device, wherein said holder comprises a base section having a first end, a second end, and a securing strap, said holder further comprising a pocket section for securing the mobile device, said pocket section having a first end and a second end, said first end having an opening, said pocket section further having a securing strap on said first end of said pocket section for opening or closing said pocket section, wherein said second end of said pocket section is flexibly connected to said second end of said base section, and said pocket section is moveable to a first position, in which said securing strap of said base section is attached said securing strap of said pocket section to secure said pocket section against said base section, and a second position in which said pocket section is loosely and flexibly attached to said second end of said base section, and wherein said securing strap of said pocket section is moveable to open or close said pocket section when said pocket section is in either said first or second position.

16. The holder of claim 15, wherein said securing strap of said pocket section includes a first and a second surface, said first and second surfaces positioned substantially opposite one another, and a first and a second securing point disposed on said first and second surfaces, respectively, of said securing strap of said pocket section, and wherein said base section has a securing point disposed on said securing strap of said base section, and wherein said securing point of said base section and said first securing point of said pocket section are attached to one another when said holder is in the first position, and detached from one another when said pocket section is in the second position.

17. The holder of claim 16, wherein said pocket section further comprises a third securing point disposed on said first end of said pocket section, wherein said second and third securing points of said pocket section are attachable to one another to close said pocket, and detachable from one another to open said pocket, when said pocket section is in either said first or second position.

* * * * *